(12) United States Patent
Parantainen et al.

(10) Patent No.: US 6,456,844 B1
(45) Date of Patent: Sep. 24, 2002

(54) METHOD FOR ADMISSION CONTROL IN INTERFERENCE-LIMITED CELLULAR RADIO NETWORK

(75) Inventors: Janne Parantainen; Oscar Salonaho, both of Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/331,358

(22) PCT Filed: Dec. 18, 1997

(86) PCT No.: PCT/FI97/00808

§ 371 (c)(1),
(2), (4) Date: Jul. 26, 1999

(87) PCT Pub. No.: WO98/31177

PCT Pub. Date: Jul. 16, 1998

(30) Foreign Application Priority Data

Dec. 19, 1996 (FI) .................................................. 965130

(51) Int. Cl.[7] .................................................. H04Q 7/20
(52) U.S. Cl. .............................. 455/423; 455/1; 455/464
(58) Field of Search .................................. 455/423, 464, 455/500, 501, 504, 509, 67.1, 67.3, 115, 447, 450, 550, 134, 135, 1; 375/130, 132, 135, 136

(56) References Cited

U.S. PATENT DOCUMENTS 5,101,503 A    3/1992  Furuya
5,239,676 A    8/1993  Strawczynski et al.
5,377,221 A   12/1994  Munday et al.
5,737,359 A * 4/1998  Koivu ........................ 375/202
5,978,675 A * 11/1999 Niemela ..................... 455/423

FOREIGN PATENT DOCUMENTS

| EP | 0 716 555 | 6/1996 |
| EP | 0 720 405 | 7/1996 |
| WO | WO 93/08655 | 4/1993 |
| WO | WO 96/04722 | 2/1996 |
| WO | WO 96/25829 | 8/1996 |
| WO | WO 96/31989 | 10/1996 |
| WO | WO 96/37082 | 11/1996 |

OTHER PUBLICATIONS

Copy of International Search Report for PCT/FI97/00808.

* cited by examiner

Primary Examiner—William Trost
Assistant Examiner—Congvan Tran
(74) Attorney, Agent, or Firm—Altera Law Group, LLC

(57) ABSTRACT

The invention relates to a method for admission control in an interference-limited cellular radio network. Admission can be accepted, if there is a sufficient number of free channels whose measured interference level goes below the interference threshold determined for the channel. The interference threshold of the channel is changed adaptively to ensure the best possible quality of the service offered. In case the quality value of the served radio connections is very good, the interference threshold value of the channel is raised.

14 Claims, 4 Drawing Sheets

METHOD FOR ADMISSION CONTROL IN INTERFERENCE-LIMITED CELLULAR RADIO NETWORK

FIELD OF THE INVENTION

The invention relates to a method for admission control in an interference-limited cellular radio network, the cellular radio network comprising a network part, at least one subscriber terminal and a bidirectional radio connection between the network part and the subscriber terminal, and the radio connection being at least on one channel, and in the network part are performed determination of the interference threshold of the channel,
measurement of the interference level of at least one free channel,
comparison of the measured interference level of the free channel with the interference threshold, and decision whether the channel is usable or unusable.

DESCRIPTION OF THE PRIOR ART

In a cellular radio network information is transferred between a network part and a subscriber terminal by transmitting signals. Five different factors may distort the signal on its way from a transmitter to a receiver: modulator of a transmitter, means of transmission, i.e. radio waves, interference sources, fading, and demodulator of a receiver. The whole formed by these factors is called a channel. Each base station has a plurality of channels at its disposal. The channels may be separated from one another by means of time (TDMA), frequency (FDMA), codes (CDMA) or any combinations of these methods. So on the channel information is transferred in a signal form. The present invention relates to interference sources. The interference sources particularly refer to interference of adjacent channels and interference caused by remote transmitters operating on the same channel.

One purpose of frequency planning is to reduce interference that transmitters operating on the same channel cause to one another. By frequency planning it is determined which frequencies can be used in which cells. To keep the interference on the channel sufficiently low, the transmitters operating on the same (or on the adjacent) channel are to be sufficiently far apart. This is known as a frequency reuse. The distance between transmitterreceiver pairs operating at the same frequency has to be of a certain length, for instance three times the cell diameter. Various reuse patterns have been designed, for instance, the seven-cell reuse pattern. In accordance with these kinds of solutions a new radio connection can always be established, if there is at least one free channel, since the transmitters operating on the same or adjacent channel are so far apart that the interference level is always sufficiently low.

Since the number of cellular radio network users has increased considerably during the past few years, the same frequencies must be reused in cells that are very close to one another. This results from the fact that only a very restricted frequency band is allocated to each network operator. The frequency band has to be utilized efficiently, otherwise the network cannot simultaneously hold enough users, and when a new user is trying to establish a connection, it cannot be admitted, the connection is blocked, i.e. no radio connection is allocated to the user.

A cellular radio network where the same frequencies are reused in cells so close to one another that the connection quality is limited by interference caused by other users, not by background noise, is called interference limited. If interference on the channel is intense, a radio connection can not necessarily be allocated to a new user, since consequently, speech or other payload cannot be transferred reliably, even though the channel itself were free. This has notable drawbacks, since if the channel is allocated for use, the user finds the quality of service provided poor and may even destroy connections of other users. Consequently, some other criterion than just the freedom of the channel has to be found for a connection to be established or to be blocked.

BRIEF DESCRIPTION OF THE INVENTION

The aim of the present invention is to provide a method by which the admission control can be implemented effectively, and which simultaneously enables an effective frequency reuse.

This is achieved with a method set forth in the preamble, the method being characterized in that it comprises the steps of assigning the channel number threshold,
deciding whether the number of free channels below the interference threshold exceeds the channel number threshold, when at least one free channel below the interference threshold is selected and allocated to a new radio connection, or whether the number of free channels below the interference threshold goes below the channel number threshold, when a new radio connection is blocked.

The invention further relates to an interference-limited cellular radio network which comprises a network part, at least one subscriber terminal and a bidirectional radio connection between the network part and the subscriber terminal, and the network part is arranged to define the interference threshold of the channel,
to measure the interference level of at least one free channel,
to compare the measured interference level of the free channel with the interference threshold of the channel, and to decide whether the channel is usable or unusable.

The system is characterized in that the network part is arranged to assign the channel number threshold,
to decide whether the number of free channels below the interference threshold exceeds the channel number threshold, when at least one free channel below the interference threshold is selected and allocated to a new radio connection, or whether the number of free channels below the interference threshold goes below the channel number threshold, when a new radio connection is blocked.

Several advantages are achieved with the method of the invention. It allows efficient definition whether new users can be admitted to the network or not. If the usability of the channel depends on the dynamically varying interference level, so the described method both enables the efficient use of radio resources and guarantees an acceptable quality to the user. The method of the invention advantageously realizable, and it is technically simple and efficient.

The system according to the invention has the same advantages as those described above in relation to the method. It is obvious that preferred embodiments and detailed embodiments can be combined with one another to provide various combinations in order to achieve the desired technical efficiency.

DESCRIPTION OF THE DRAWINGS

In the following the invention will be described in greater detail with reference to the examples in accordance with the attached drawings, in which.

DESCRIPTION OF THE PREFERRED EMBODIMENTS

Figure 1:
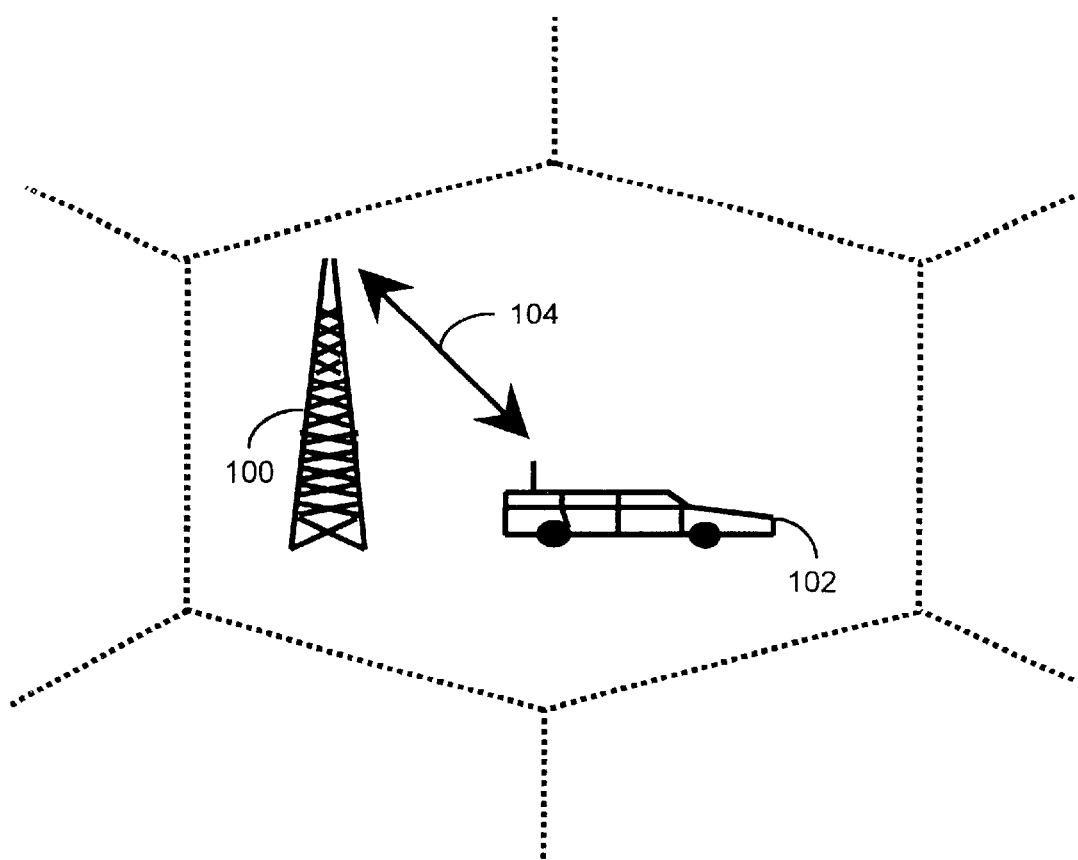
FIG. 1 illustrates an interference-limited cellular radio network.

FIG. 1 is examined. Between a network part 100 and a subscriber terminal 102 there is a bidirectional radio connection 104. That part of the network part 100 which actually forms the radio connection 104 is a base station. The network part further comprises, for instance, a base station controller, a mobile services switching centre and a network management system. The base station has a coverage area, i.e. a cell (shown in the figure as a hexagonal area). The radio connection 104 is on the channel. On the channel, there may occur interference caused especially by a base-station-terminal pair operating on the same channel in any nearby cell.

Figure 3:
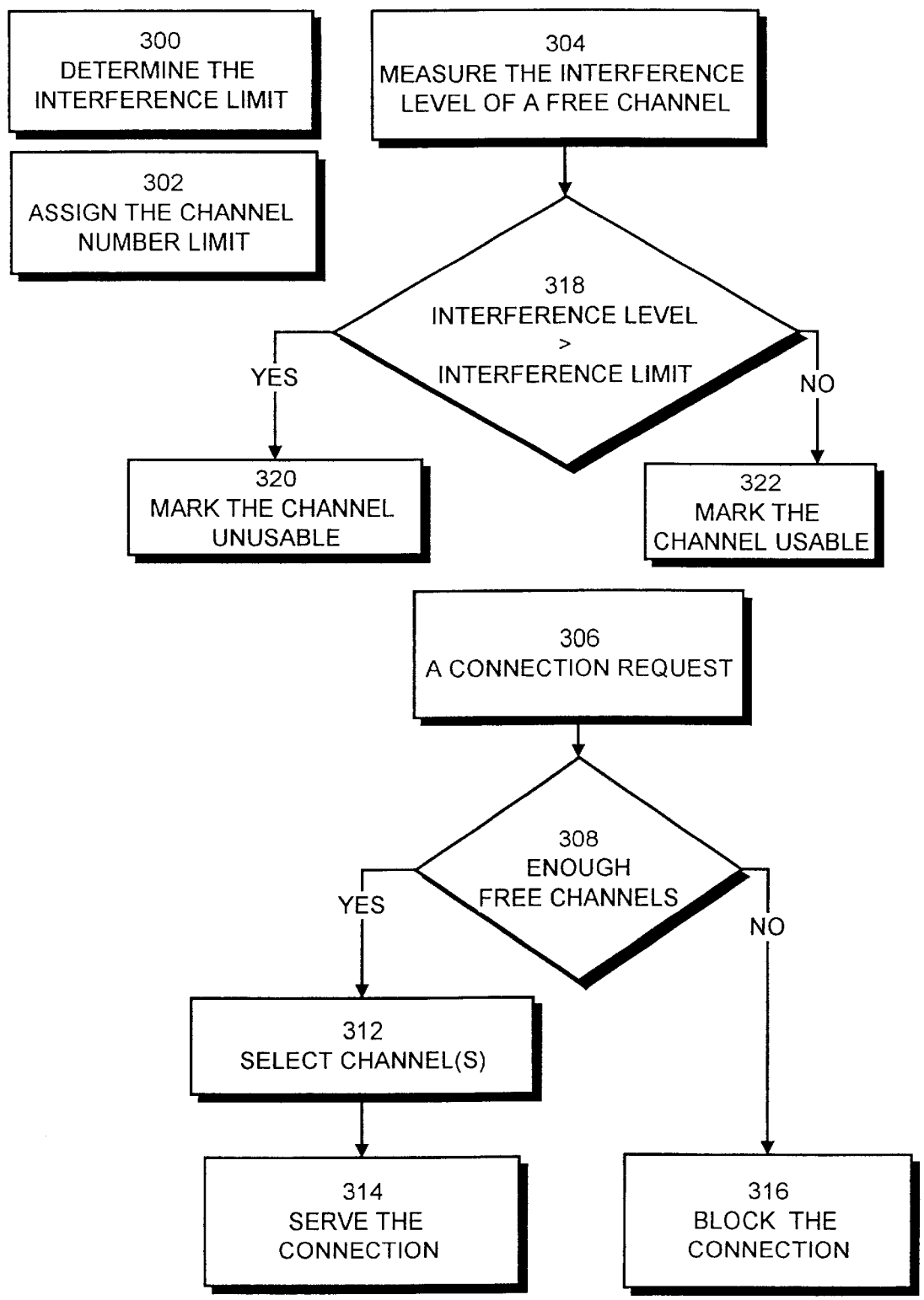
FIG. 3 illustrates steps of admission control as a flow chart

Admission control refers to the operations by which the decision is made on the opening or blocking of the radio connection 104. FIG. 3 is examined. The method of the invention comprises the following steps:

Determination 300 of an interference threshold of a channel. The interference threshold of the channel refers to the numerical value below which interference is so low that the channel can be made available to a new radio connection 104. If the measured numerical value of interference occurring on the channel exceeds the interference threshold, the channel cannot be made available to a new radio connection 104. During the manufacturing process and/or when the network is being built, a default value is set for the interference threshold. Later on, when the network is already in use, this value is changed dynamically to correspond to the operating conditions, using the method described later in this text, and/or the network operator sets a value for this parameter, for instance, by means of a network management system.

Assignment 302 of a channel number threshold. The channel number threshold (1, 2, 3, . . . N) refers to a parameter which indicates how many free channels below the interference threshold are needed for a new radio connection 104 to be established. Normally, one channel will suffice to establish a connection. The network operator sets a value for this parameter, for instance, by means of a network management system. During the manufacturing process and/or when the network is being built, a default value is set for the channel number threshold. If a plurality of free channels is required, the channel allocation can be changed dynamically when interferences on the channel change, and the quality of the radio connection 104 offered can be maintained high. On the other hand, if too many free channels are required, before a new radio connection 104 can be established, then the blocking of radio connections 104 increases, and the user finds the quality of service provided poor.

Measurement 304 of the interference level of at least one free channel. Free channels are periodically or randomly measured for interference level. This is carried out in accordance with the prior art, for instance, with a measuring receiver at a base station.

Comparison of the interference level of the measured free channel with the interference threshold 318 and decision whether the channel is usable 322 or unusable 320. At this step, it is decided whether the interference level of the free channel is sufficiently low, in order that it could be made available to a new radio connection 104.

Decision whether the number of free channels below the interference threshold exceeds the channel number threshold, when at least one free channel below the interference threshold is selected 312 and allocated 314 to a new radio connection 104, or whether the number of free channels below the interference threshold goes below the channel number threshold, when a new radio connection 104 is blocked 316.

Figure 4:
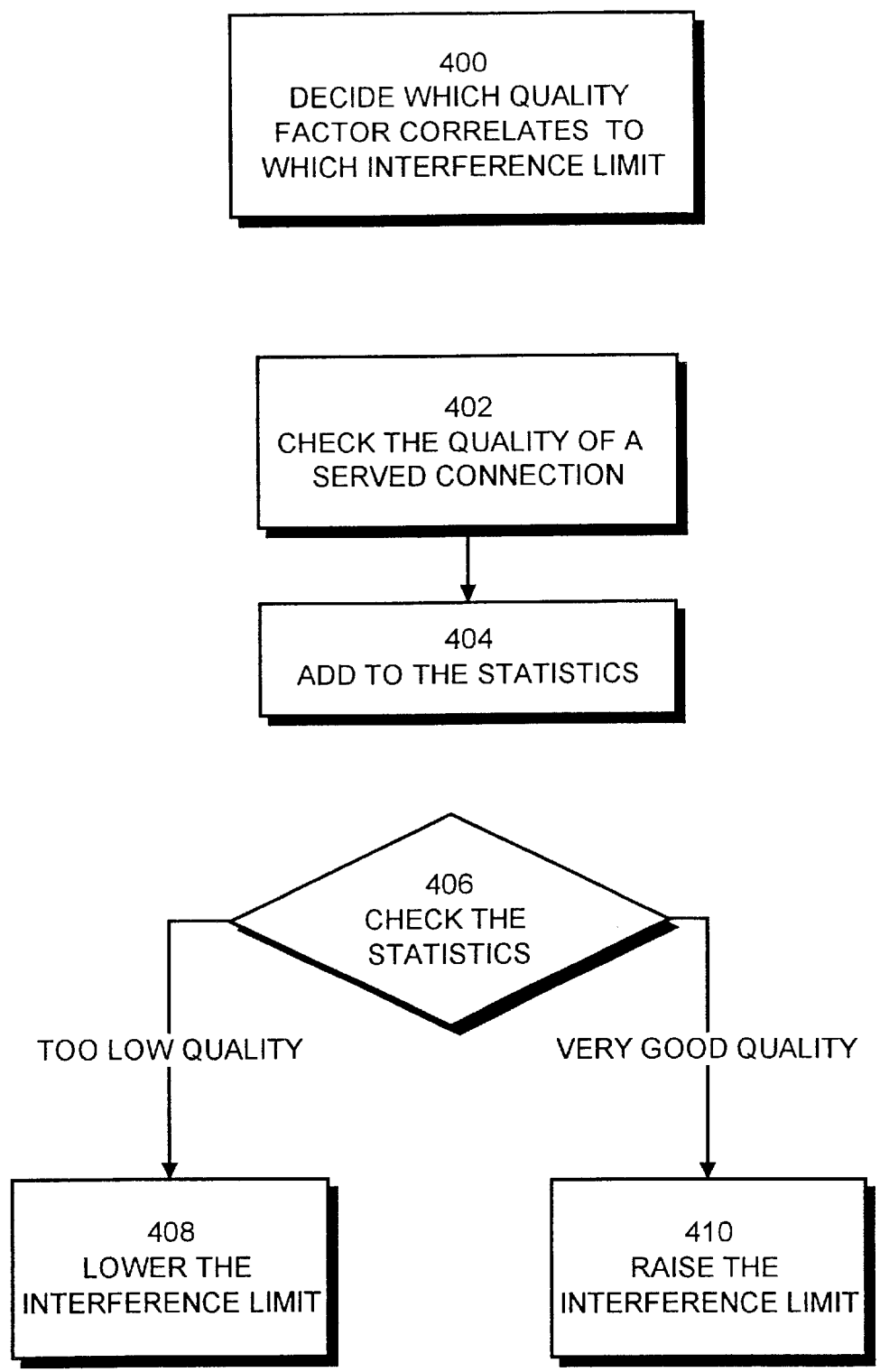
FIG. 4 illustrates steps of determining an interference threshold of a channel as a flow chart

The determination of the interference threshold of the channel is a significant part of the invention. FIG. 4 is examined. The determination is carried out by following steps:

Decision on which quality value of served radio connections correlates to which interference threshold of the channel 400. This means that it is indicated in some specific form, for instance, as a table or a mathematical formula, which quality value correlates to which interference threshold. The network operator determines this correlation, for instance, by means of the network management system. During the manufacturing process and/or when the network is being built, some specific default value correlation is determined.

Monitoring 402 and adding to the statistics 404 the quality value of radio connections 104 served by the network part. This means that an indicator is provided for the quality of radio connections 104, on the basis of which indicator the quality of each served radio connection 104 is assessed. A quality indicator is; for instance, an average number of defective bits per each transmitted information packet (for instance a frame), the number of prematurely interrupted radio connections 104, or some other known indicator. In packet transmission, for instance, when data is transferred in packets, a quality indicator may be, for instance, the ratio of the negotiated bit rate to the actual bit rate, the bit rate, the ACK/NACK ratio (i.e. the relationship between packets received without defects and packets retransmitted), or some other known indicator. It must be emphasized that in view of the invention, it is not essential which indicator is used, but how it is used in the described method of determining the interference threshold of the channel. The measured quality of each served radio connection 104 or some of the served radio connections 104 is added to the statistics.

Changing 406 of the interference threshold value of the channel. Periodically, randomly or at request of a network element, the network part 100 updates the interference threshold value of the channel in accordance with the following logic:

If the quality value of the served radio connections 104 is too low, the interference threshold value of the channel is lowered 408. This means that utilizing the above-mentioned correlation, according to which the quality value in the statistics of the served radio connections 104 correlates to an interference threshold value of the channel, the interference threshold value is changed to have a lower value. As a consequence the quality of served connections 104 will improve in the long run.

If the quality value of served connections 104 is very good, the interference threshold value of the channel is raised 410. Then bit errors in the connections increase, but the connections remain, however, sufficiently good, since the number of defective bits is still sufficiently low to enable error correction. On the other hand, the quality of service improves, since the number of blocked radio connections 104 diminishes. The interference threshold value is not to be changed frequently without ground. So a certain range of variation for a quality factor can be regarded as reasonably good quality. As long as the quality remains within this range, the interference threshold value is not changed. In this way the unnecessary unstability of the system is avoided.

In one embodiment the interference threshold value of the channel and/or the channel number threshold value depend on the type of service transmitted in the radio connection 104. For instance, one free low interference channel is sufficient to speech services. For a video call, in which a moving picture is transmitted, the channel number threshold value may be much higher, for instance eight. On the other hand, when packet transmission is used, for instance, for data transmission, the interference threshold value may differ greatly from the interference threshold used for speech services.

The interference threshold values can be adapted in such a way that adaptation steps are the same for all services, but the difference of the threshold values of various services equals to the difference of the C/I targets. So for example, for speech the C/I value is 15 dB and for data 10 dB. Thus the interference threshold value for speech is −100 dBm and for data −105 dBm. Now that the interference threshold value of a specific service is to be changed, simultaneously the interference threshold value of other services is changed with an equal adaptation step.

In one embodiment the channel performs frequency hopping. In this case the channel refers to a hopping sequence, in other words, data of the same user is transmitted in the radio connection 104 by changing a frequency and/or a time slot within different frames. Various frequency hopping types comprise cyclic frequency hopping and random frequency hopping. The cyclic frequency hopping is performed constantly along a specific short hopping sequence. In the random frequency hopping, hopping is performed in accordance with a long pseudo-random sequence, i.e. various frequencies and/or time slots are used in a random order.

In the cyclic frequency hopping, the hopping sequence is equated with the channel and interference is measured from channels included in the sequence. In the admission control a new radio connection is admitted if there is a sufficient number of sufficiently good hopping sequences available. An indicator showing the degree of quality is, for instance, one or some of the following: the average interference of the sequence, the maximum interference of the sequence, a sufficient number of sequence channels with sufficiently low interference.

In the random frequency hopping, the interference level of the channel is determined by measuring the interference level of a channel set and by determining the average interference level of the channel. A channel set refers to some specific channels or all channels. In the admission control a new radio connection is admitted if the average interference is sufficiently low, and a required number of transmitter-receiver pairs is available at the base station. So, in this case the channel number threshold is not used, since all channels have the same interference, on average.

It is obvious to one skilled in the art that the performance order of the described method steps may vary, so for instance, the steps 300 and 302 of FIG. 3 can be performed at almost any stage.

An arrangement in a cellular radio network according to the described method is easy to implement. Relatively small modifications are needed for the network part 100. The network part 100 is arranged to define the interference threshold of the channel,
    to assign the channel number threshold,
    to measure the interference level of at least one free channel,
    to compare the measured interference level of the free channel with the interference threshold of the channel, and to decide whether the channel is usable or unusable,
    to decide whether the number of free channels below the interference threshold exceeds the channel number threshold, when at least one free channel below the interference threshold is selected and allocated to a new radio connection 104, or whether the number of free channels below the interference threshold goes below the channel number threshold, when a new radio connection 104 is blocked.

The network part 100 is arranged to define the interference threshold of the channel to the effect that the network part 100 is arranged to decide which quality value of the served radio connections 104 correlates to which interference threshold value of the channel,
    to monitor and add to the statistics the quality value of the radio connections 104 served by the network part 100,
    to change the interference threshold value of the channel:
        if the quality value of the served radio connections 104 is too low, the interference threshold value of the channel is lowered,
        if the quality value of the served radio connections 104 is very good, the interference threshold value of the channel is raised.

In one embodiment the network part 100 is arranged to determine the interference threshold value of the channel and/or the channel number threshold depending on the quality of service transmitted in the radio connection 104.

In one embodiment the network part 100 comprises a frequency hopping unit 214 which enables cyclic or random hopping. In the latter case the network part 100 is arranged to measure the interference level of a channel set and to form the average interference level of a channel.

Figure 2:
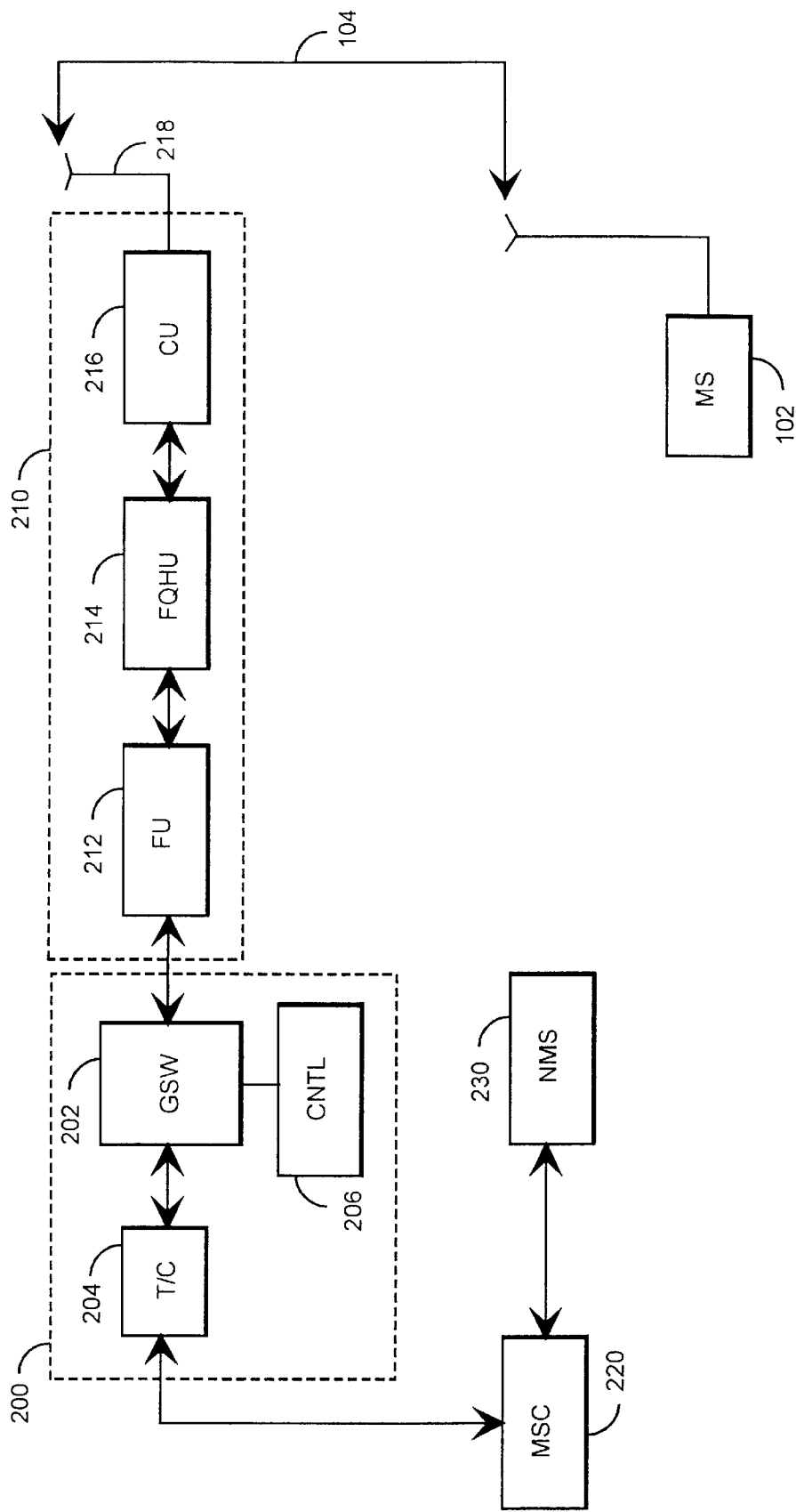
FIG. 2 illustrates by way of example how arrangements according to the invention are carried out in the network part.

FIG. 2 is examined, in which it is described by way of example how the network part 100 is arranged to perform the necessary handling. The network part comprises a base station 210, a base station controller 200, a mobile services switching centre 220, and a network management system 220. The mobile services switching centre 220 communicates with the base station controller 200. The base station controller 200 communicates with the base station 210. The base station controller 200 comprises a group switching network 202, a transcoder 204 and a control unit 206. The group switching network 202 is used to switch speech and data, and to connect signalling circuits. The transcoder 204 converts the different digital coding modes of speech, used between the public telephone network and the mobile network, compatible with each other. The control unit 206 performs call control, mobility management, collecting of statistical data, and signalling. The base station 210 comprises a frame unit 212, a frequency hopping unit 214, a carrier unit 216 and an antenna 218. In the frame unit 212 are performed channel coding, channel interleaving, data encrypting and burst forming. In the frequency hopping unit 214 is performed potential frequency hopping onto the baseband wave. In the carrier unit 216 are performed modulation and analogue-to-digital conversion of the transmitted signal. By means of the network management system 230 various operations of the cellular radio network are used, controlled and maintained. The network operator adjusts through the network management system 230 different parameters of the cellular radio network and thus controls its operation. The main function of the mobile services switching centre 220 is call control.

The base station controller 200 establishes a connection with a subscriber terminal 102 by requesting the base station 210 to transmit a message to the subscriber terminal 102 for call 104 establishment. Correspondingly, the subscriber terminal 102 responds to the call 104 establishment message. The simplest way to implement the invention is to convert the arrangements required by the network part 100 into software. Then the software can be installed, for instance, in the memory of the control part 206 of the base station controller 200. The network operator changes the necessary parameter values through the network management system 230 which communicates with the base station controller 210, for instance, via the mobile services switching centre 220. On the other hand, the arrangement can be implemented with general or signal processors, or with separate logic. The division of operations between the base station controller 200 and the base station 210 can also be performed in some other way in the spirit of the invention. Any other part of the network part 100, for instance, the mobile services switching centre 220, can also be arranged to perform the operation required by the invention in accordance with the described principles.

Even though the invention has been described in the above with reference to an example in accordance with the attached drawings, it is obvious that the invention is not restricted thereto, but it can be modified in a variety of ways within the scope of the inventive idea disclosed in the appended claims.

What is claimed is:

1. A method for admission control in an interference-limited cellular radio network, the cellular radio network comprising a network part, at least one subscriber terminal, and a bidirectional radio connection between the networ part and the subscriber terminal, and the radio connection being at least in one channel, and in the network part are performed
   determining an interference threshold value of the channel,
   measuring an interference level of at least one free channel,
   comparing the measured interference level of the free channel with the interference threshold value of the channel, and deciding whether the channel is usable or unusable,
   wherein the method comprises assigning a channel number threshold,
   deciding whether a number of free channels below the interference threshold value exceeds the channel number threshold, when at least one free channel below the interference threshold value is selected and allocated to a new radio connection, or whether the number of free channels below the interference threshold value goes below the channel number threshold, when a new radio connection is blocked.

2. The method as claimed in claim 1, wherein determination of the interference threshold value of the channels comprises deciding which quality value of served radio connections correlates to which interference threshold value of the channel,
   monitoring and adding to the statistics the quality value of radio connections served by the network part, changing the interference threshold value of the channel:
   if the quality value of the served radio connections is too low, the
   interference threshold value of the channel is lowered,
   if the quality value of the served radio connections is very good, the
   interference threshold value of the channel is raised.

3. The method as claimed in claim 1, wherein the interference threshold value of the channel depends on the quality of service transmitted in the radio connection.

4. The method as claimed in claim 1, wherein the channel. number threshold depends on the quality of service transmitted in the radio connection.

5. The method as claimed in claim 1, wherein the channel performs frequency hopping.

6. The method as claimed in claim 1, wherein in cyclic frequency hopping, a hopping sequence is equated with the channel.

7. The method as claimed in claim 1, wherein in random frequency hopping, the interference level of the channel is determined by measuring an interference level of a channel set and by determining an average interference level of the channel.

8. An interference-limited cellular radio network comprising a network part, at least one subscriber terminal and a bidirectional radio connection between the network part and the subscriber terminal, and the radio connection being on at least one channel, and the network part is arranged

- to determine an interference threshold value of the channel,
- to measure an interference level of at least one free channel,
- to compare the measured interference level of the channel with the interference threshold value of the channel and to decide whether the channel is usable or unusable, wherein the network part is arranged
- to assign a channel number threshold,
- to decide whether a number of free channels below the interference threshold value exceeds the channel number threshold, when at least one free channel below the interference threshold value is selected and allocated to a new radio connection, or whether the number of free channels below the interference threshold value goes below the channel number threshold, when a new radio connection is blocked.

9. The system as claimed in claim 8, wherein, the network part is arranged to determine the interference threshold value of the channel in such a way that the network part is arranged

- to determine which quality value of the served radio connections correlates to which interference threshold value of the channel,
- to monitor and add to the statistics the quality value of the radio connections served by the network part,
- to change the interference threshold value of the channel:
    - if the quality value of the served radio connections is too low, the interference threshold value of the channel is lowered,
    - if the quality value of the served radio connections is very good, the interference threshold value of the channel is raised.

10. The system as claimed in claim 8, wherein the network part is arranged to determine the interference threshold value of the channel depending on the quality of service transmitted in the radio connection.

11. The system as claimed in claim 8, wherein the network part is arranged to determine the channel number threshold value depending on the quality of service transmitted in the radio connection.

12. The system as claimed in claim 8, wherein the network part comprises a frequency hopping unit.

13. The system as claimed in claim 8, wherein the network part comprises a frequency hopping unit that provides cyclic hopping.

14. The system as claimed in claim 8, wherein the network part comprises a frequency hopping unit that provides random hopping, and that the network part is arranged to measure the interference level of a channel set and to determine the average interference level of the channel.

* * * * *